(12) United States Patent
Yamaguchi et al.

(10) Patent No.: US 8,051,219 B2
(45) Date of Patent: Nov. 1, 2011

(54) STORAGE SYSTEM WITH PERFORMANCE LIMIT DETECTION UNIT AND PROCESSING PERCENTAGE DETERMINATION UNIT FOR ENSURING PRIORITY DATA PERFORMANCE

(75) Inventors: Yasuhiko Yamaguchi, Ninomiya (JP); Sadahiro Sugimoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 12/499,933

(22) Filed: Jul. 9, 2009

(65) Prior Publication Data

US 2009/0271535 A1  Oct. 29, 2009

Related U.S. Application Data (63) Continuation of application No. 11/581,414, filed on Oct. 17, 2006, now abandoned.

(30) Foreign Application Priority Data

Sep. 1, 2006  (JP) ................. 2006-238150

(51) Int. Cl.
*G06F 3/00* (2006.01)
*G06F 13/362* (2006.01)
(52) U.S. Cl. ......................................... 710/18; 710/117
(58) Field of Classification Search ............. 710/18
See application file for complete search history.

(56) References Cited

U.S. PATENT DOCUMENTS

| 4,890,227 | A | 12/1989 | Watanabe et al. |
| 5,218,456 | A | 6/1993 | Stegbauer et al. |
| 5,533,205 | A | 7/1996 | Blackledge et al. |
| 5,784,582 | A | 7/1998 | Hughes |
| 7,143,219 | B1 * | 11/2006 | Chaudhari et al. ............ 710/111 |
| 2005/0193168 | A1 * | 9/2005 | Eguchi et al. ................. 711/114 |

FOREIGN PATENT DOCUMENTS

| EP | 1471441 | 10/2004 |
| EP | 1577747 | 9/2005 |
| JP | 2002108567 | 4/2002 |

\* cited by examiner

*Primary Examiner* — Alford Kindred
*Assistant Examiner* — Brooke Dews
(74) *Attorney, Agent, or Firm* — Brundidge & Stanger, P.C.

(57) ABSTRACT

A highly-reliable storage system and data input/output control method, which can ensure priority data input/output performance, is provided. A performance limit, which is the number of data input/output processes per unit of time, is detected; and a processing percentage for each of one or more priority targets for which data input/output processing should be prioritized, and a group of one or more non-priority targets that includes of one or more other targets, which correspond to input/output processing request types, is determined based on the performance limit detected, and a targeted performance; and the storage apparatus executes data input/output processing for the one or more priority targets and the group of one or more non-priority targets at respective frequencies determined by the processing percentage determination unit.

14 Claims, 10 Drawing Sheets

51

| TARGET | PROCESSING PERCENTAGE | I/O PROCESSING ORDER | | | | | | | | |
|---|---|---|---|---|---|---|---|---|---|---|
| | | 51A | 51B | 51C | | | | | | |
| WORK 1 | 50% | 1 | 5 | 9 | 12 | 14 | 16 | 17 | 18 | 19 | 20 |
| WORK 2 | 25% | 2 | 6 | 10 | 13 | 15 | - | - | - | - | - |
| WORK 3 | 10% | 3 | 7 | - | - | - | - | - | - | - | - |
| OTHERS | 15% | 4 | 8 | 11 | - | - | - | - | - | - | - |

| TARGET | TARGETED PERFORMANCE [IOPS] | PROCESSING PERCENTAGE [%] |
|---|---|---|
| WORK 1 | 10000 | 50 |
| WORK 2 | 5000 | 25 |
| WORK 3 | 2000 | 10 |
| OTHERS | - | 15 |
| PERFORMANCE LIMIT | 20000[IOPS] | |

FIG.6

| TARGET | PROCESSING PERCENTAGE | I/O PROCESSING ORDER | | | | | | | | |
|---|---|---|---|---|---|---|---|---|---|---|
| WORK 1 | 50% | 1 | 5 | 9 | 12 | 14 | 16 | 17 | 18 | 19 | 20 |
| WORK 2 | 25% | 2 | 6 | 10 | 13 | 15 | - | - | - | - | - |
| WORK 3 | 10% | 3 | 7 | - | - | - | - | - | - | - | - |
| OTHERS | 15% | 4 | 8 | 11 | - | - | - | - | - | - | - |

FIG.3

| TARGET | TARGETED PERFORMANCE [IOPS] | PROCESSING PERCENTAGE [%] | ACTUAL MEASUREMENT PERFORMANCE VALUE [IOPS] |
|---|---|---|---|
| WORK 1 | 10000 | 50 | 8000 |
| WORK 2 | 5000 | 25 | 5000 |
| WORK 3 | 2000 | 10 | 3000 |
| OTHERS | - | 15 | 4000 |

| | Step1 | | Step2 | Step3 | |
|---|---|---|---|---|---|
| TARGET | TARGETED PERFORMANCE [IOPS] | PROCESSING PERCENTAGE [%] | ACTUAL MEASUREMENT PERFORMANCE VALUE [IOPS] | PROCESSING PERCENTAGE [%] | ACTUAL MEASUREMENT PERFORMANCE VALUE [IOPS] |
| WORK 1 | 10000 | 50 | 8000 | 63 | 9800 |
| WORK 2 | 5000 | 25 | 5000 | 25 | 5000 |
| WORK 3 | 2000 | 10 | 3000 | 7 | 2200 |
| OTHERS | - | 15 | 4000 | 5 | 1500 |

| TARGET (52A) | TARGETED PERFORMANCE [IOPS] (54B) | COMMAND PROCESSING PERCENTAGE [%] (54C) | ACTUAL MEASUREMENT VALUE (54D) |
|---|---|---|---|
| WORK 1 | 10000 | 50 | 5000 |
| WORK 2 | 5000 | 25 | 5000 |
| WORK 3 | 2000 | 10 | 5000 |
| OTHERS | - | 15 | 5000 |

FIG.10

| TARGET (55A) | 6:00~7:00 (55B) | 7:00~8:00 (55C) | 8:00~9:00 (55D) | ... (55E) |
|---|---|---|---|---|
| WORK 1 | 10000 | 5000 | 2000 | ... |
| WORK 2 | 5000 | 5000 | 8000 | ... |
| WORK 3 | 2000 | 3000 | 5000 | ... |

| TARGET | PROCESSING PERCENTAGE | COMMAND PROCESSING ORDER | | | | | | | | | |
|---|---|---|---|---|---|---|---|---|---|---|---|
| LDEV1 | 50% | 1 | 5 | 9 | 12 | 14 | 16 | 17 | 18 | 19 | 20 |
| LDEV2 | 25% | 2 | 6 | 10 | 13 | 15 | - | - | - | - | - |
| LDEV3 | 10% | 3 | 7 | - | - | - | - | - | - | - | - |
| OTHER | 15% | 4 | 8 | 11 | - | - | - | - | - | - | - |

STORAGE SYSTEM WITH PERFORMANCE LIMIT DETECTION UNIT AND PROCESSING PERCENTAGE DETERMINATION UNIT FOR ENSURING PRIORITY DATA PERFORMANCE

CROSS-REFERENCES TO RELATED APPLICATIONS

The present application is a continuation of application Ser. No. 11/581,414, filed Oct. 17, 2006, now abandoned; which relates to and claims priority from Japanese Patent Application No. 2006-238150, filed on Sep. 1, 2006, the entire disclosure of which is incorporated herein by reference.

BACKGROUND OF THE INVENTION

1. Field of the Invention

The invention relates to a storage system and a data input/output control method, for example, one that is suited for use in a storage system in which a host apparatus executes the processing for various kinds of work using application programs.

2. Description of Related Art

Conventionally, in a storage apparatus, the data input/output processing for data input/output requests from a host apparatus is performed by a processor associated with a port connected to the host apparatus. Accordingly, the data input/output processing for high-priority work and that for low-priority work may be performed by the same processor. In such circumstances, when the low-priority work has a heavy load, the high-priority work, affected by the low-priority work's heavy load, cannot reserve its necessary bandwidth.

A conventional method for solving the above problem is outlined in JP-A-2002-108567, which proposes a method for reserving the bandwidth for data input/output from/to priority host apparatuses by a user setting an upper limit or threshold value for data input/output processing for each of the ports, WWNs (World Wide Names), or devices in a single storage apparatus, to limit data input/output from/to non-priority host apparatuses.

SUMMARY OF THE INVENTION

However, the method disclosed in JP-A-2002-108567 has a problem in that it only limits non-priority data input/output, and priority data input/output performance is not ensured.

The present invention has been made in light of the above points, and has the objective of providing a highly-reliable storage system and data input/output control method, which can ensure priority data input/output performance.

In order to achieve the objective, the present invention provides a storage system including a storage apparatus that performs data input/output processing according to a data input/output request received from a host apparatus, the storage system including: a performance limit detection unit that detects a performance limit, which is the number of data input/output processes per unit of time that is the limit in the storage apparatus; and a processing percentage determination unit that determines a processing percentage for data input/output processes for each of one or more priority targets for which data input/output processing should be prioritized, and a group of one or more non-priority targets that consists of one or more other targets, from among one or more targets, which correspond to input/output processing request types, the processing percentage being determined based on the performance limit detected by the performance limit detection unit, and a targeted performance that is a targeted number of data input/output processes per unit of time set in advance for each of the one or more priority targets, wherein the storage apparatus executes data input/output processing for the one or more priority targets and the group of one or more non-priority targets at respective frequencies corresponding to the processing percentages determined by the processing percentage determination unit.

Accordingly, this storage system makes it possible to execute the data input/output processing for the priority targets and the non-priority target group at the frequencies corresponding to the respective processing percentages determined by the processing percentage determination unit.

The present invention also provides a data input/output control method for controlling data input/output to/from a storage apparatus that performs data input/output processing according to a data input/output request received from a host apparatus, the method including: a first step of detecting a performance limit, which is the number of data input/output processes per unit of time that is the limit in the storage apparatus; and a second step of determining a processing percentage for each of one or more priority targets for which data input/output processing should be prioritized, and a group of one or more non-priority targets that consists of one or more other targets, from among one or more targets, which correspond to input/output processing request types, the processing percentage being determined based on the performance limit detected by the performance limit detection unit, and a targeted performance that is a targeted number of data input/output processes per unit of time set in advance for each of the one or more priority targets; and a third step of the storage apparatus executing data input/output processing for the one or more priority targets and the group of one or more non-priority targets at respective frequencies corresponding to the processing percentages determined by the processing percentage determination unit.

Accordingly, this storage system makes it possible to execute the data input/output processing for the priority targets and the non-priority target group at the frequencies corresponding to the respective processing percentages determined by the processing percentage determination unit.

The present invention makes it possible to provide a highly-reliable storage system and data input/output control method, which can ensure the priority data input/output performance.

Other aspects and advantages of the invention will be apparent from the following description and the appended claims.

DETAILED DESCRIPTION OF PREFERRED EMBODIMENTS

An embodiment of the present invention will be described below with reference to the drawings.

(1) Overall Configuration of the Storage System

Figure 1:
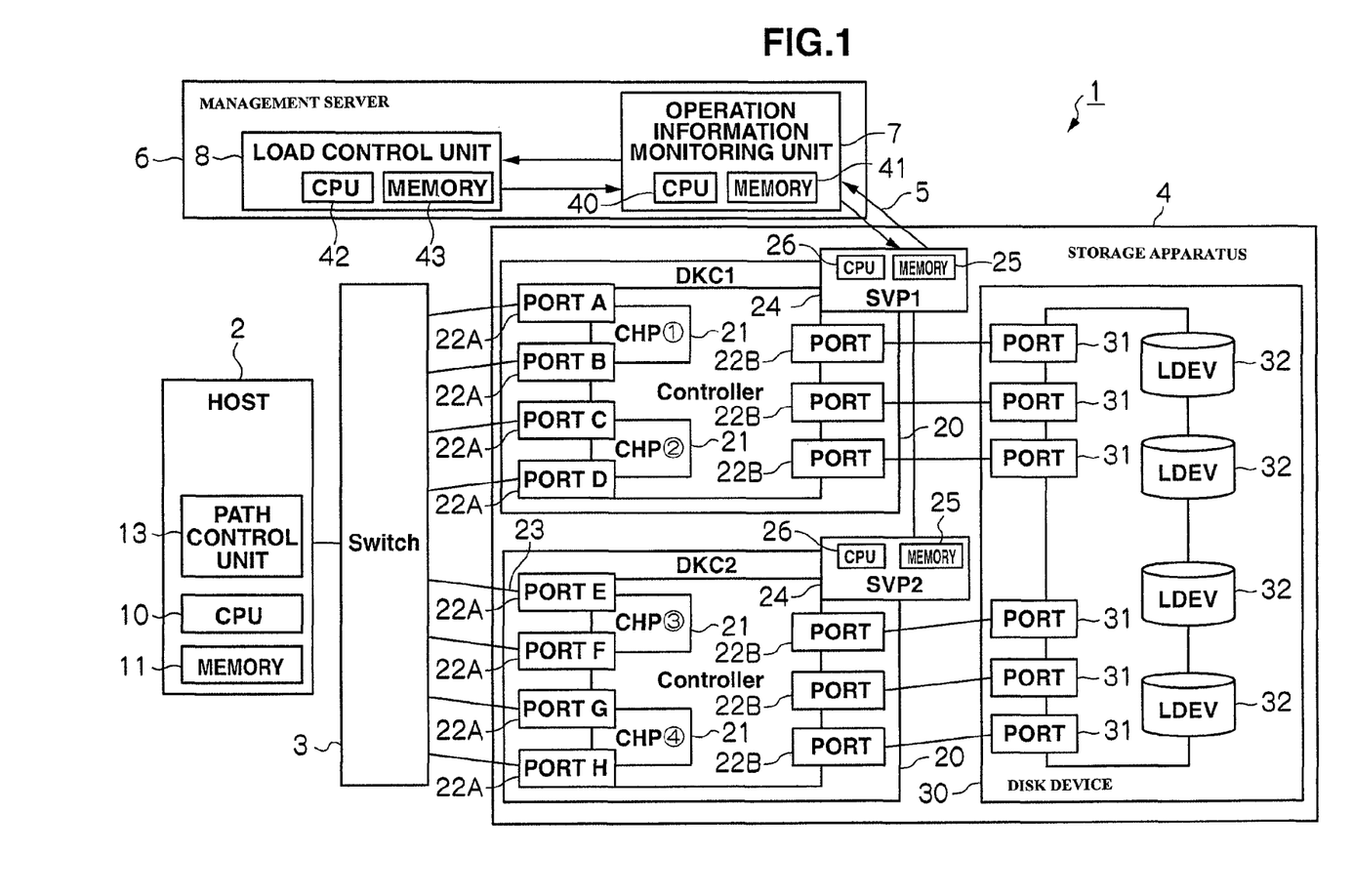
FIG. 1 is a block diagram showing a storage system 1 according to an embodiment of the present invention.

In FIG. 1, 1 denotes the entire storage system 1 according to an embodiment of the present invention. This storage system 1 is configured by a host apparatus 2 being connected to a storage apparatus 4 via a switch 3 and a management server 6 being connected to the storage apparatus 4 via an IP (Internet Protocol) network 5.

The host apparatus 2, which is a higher-level apparatus, is a computer including information processing resources, such as a CPU (Central Processing Unit) 10, memory 11, and a path control unit 13, and is, for example, a personal computer, a work station, or a mainframe. The host apparatus 2 includes information input devices (not shown), such as a keyboard, a switch, a pointing device, or a microphone, and information output devices (not shown), such as a monitor display, or a speaker.

The CPU 10 is a processor that controls the overall operation of the host apparatus 2. The memory 11 is used to hold application programs used by users for work, and is also used as work memory for the CPU 10. The CPU 10 executes application programs held in the memory 11, and as a result, various kinds of processing relating to the relevant work are executed by the entire host apparatus 2. When a plurality of paths is used, the path control unit 13 controls processing commands issuing them evenly between all the paths.

The switch 3 is a Fibre Channel network, and consists of a plurality of Fibre Channel switches. The communication between the host apparatus 2 and the storage apparatus 4 via this switch 3 is conducted according to Fibre Channel Protocol.

The storage apparatus 4, as shown in FIG. 1, includes a disk device unit 30 that provides a storage area for storing data, and control units (DKC) 20 that control data input/output to/from the disk device unit 30.

The disk device unit 30 includes a plurality of disk devices (not shown) and a plurality of ports 31. The disk devices are, for example, expensive disks, such as SCSI (Small Computer System Interface) disks, or inexpensive disks such as SATA (Serial AT Attachment) disks or optical disks.

These disk devices are managed by the control units 20 according to RAID methodology. One or more logical devices (LDEV) 32 are defined over the physical storage areas provided by one or more disk devices. Data from the host apparatus 2 is stored in the logical devices in blocks of a predetermined size (hereinafter referred to as "logical blocks").

Each logical device 32 is assigned a unique identification (ID) number. In this embodiment, data is output/input designating an address, which is the combination of an ID number and a unique number assigned to each block (LBA: Logical Block Address).

Each control unit 20 includes a plurality of channel processors (CHP) 21, a plurality of disk-side ports 22, and a service processor (SVP) 24.

Each channel processor 21 is constructed as a microcomputer system including, for example, a microprocessor, memory, and a communication interface, and has host-side ports 22A for connecting with the switch 3. The channel processors 21 interpret various kinds of commands sent from the host apparatus 2 and execute the relevant processing. Each of the host-side ports 22A of each channel processor 21 is assigned a network address for identifying the host-side port (e.g., an IP address or WWN), making it possible for each channel processor 21 to individually behave as a NAS (Network Attached Storage) device.

The disk-side ports 22B are, for example, ports complying with the Fibre Channel standards, and are connected to the corresponding ports 31 in the disk device unit 30 via cables. The data transmission between the control units 20 and the disk device unit 30 is conducted via these disk-side ports 22B.

The service processor 24 is a terminal device for maintaining/managing the storage apparatus 4. The storage system 1 administrator can, for example, change the settings for the RAID configuration or the ECC (Error Correction Code) group configuration, such as the settings involved in the addition of disk devices in the disk device units 30, via this service processor 24.

The service processor 24 is constructed as a microcomputer system including information processing resources such as memory 25 and a CPU 26. The memory 25 is used to store and hold various kinds of control programs and various kinds of tables, and is also used as work memory for the CPU 26. The later-described targeted performance setting table 50 is also stored and held in this memory 25. The CPU 26 executes control programs stored in the memory 25, and as a result, various kinds of processing are executed by the entire service processor 24.

The management server 6 is a server for monitoring and managing the storage apparatus 4, and includes an operation information monitoring unit 7 and a load control unit 8. The operation information monitoring unit 7 and load control unit 8 are connected to the host apparatus 2 and the storage apparatus 4 via an IP network 5.

The operation information monitoring unit 7 has a function that collects and manages the operation information of the storage apparatus 4, and includes information processing resources such as a CPU 40 and memory 41. The memory 41 stores various kinds of control programs, the later-described actual measurement performance value table 52 and work-specific actual measurement performance value table 53. The CPU 40 executes the control programs stored in this memory 41, and as a result, various kinds of processing are executed.

The load control unit 8 has a function that controls the load of the data input/output processing performed by each channel processor 21, and includes information processing resources such as a CPU 42 and memory 43. The memory 43 stores various kinds of control programs and the later-described targeted performance setting table 50. The CPU 42 executes control programs stored in the memory 43, and as a result, various kinds of processing are executed.

(2) Data Input/Output Control Function According to this Embodiment

(2-1) Table Structures

Next, the data input/output control function employed in this storage system 1 will be described.

The storage system according to claim 1 has the characteristic of employing a data input/output control function that controls the data input/output processing for priority work, from among work for which the host apparatus 2 performs various kinds of processing based on the relevant application programs, to be performed at frequencies corresponding to the performances set by a user.

As means for performing various kinds of processing relating to the aforementioned data input/output control function, the service processor 24's memory 25 in each control unit 20, and the load control unit 8's memory 43 store the targeted performance setting table 50, and the operation information control unit 7's memory 40 stores the actual measurement performance value table 52, and the work-specific actual measurement performance value table 53.

The targeted performance setting table 50 is a table used to specifically manage the targeted performances set by a user for work for which the data input/output processing should be prioritized (hereinafter referred to as "prioritized work") and the other (remaining) work (hereinafter referred to as the "non-prioritized work group") from among the work performed by the host apparatus 2. Here, the "targeted performance" refers to the number of data input/output processes per second (IOPS) performed for prioritized work or for the non-prioritized work group. The targeted performance setting table 50, as shown in FIG. 2, has target fields 50A, and targeted performance fields 50B, and processing percentage fields 50C.

Each target field 50A stores an ID assigned to the corresponding prioritized work or non-prioritized work group. Each target performance field 50B stores a targeted performance, which is expected by the user for the corresponding prioritized work. Each processing percentage field 50C stores the percentage for the targeted performance of the corresponding prioritized work or the non-prioritized work group of the number of data input/output processes per second performed by the entire storage system 1 (hereinafter referred to as the "performance limit"). The lowermost row 50D of the targeted performance setting table 50 stores a previously-measured performance limit.

Figure 2:
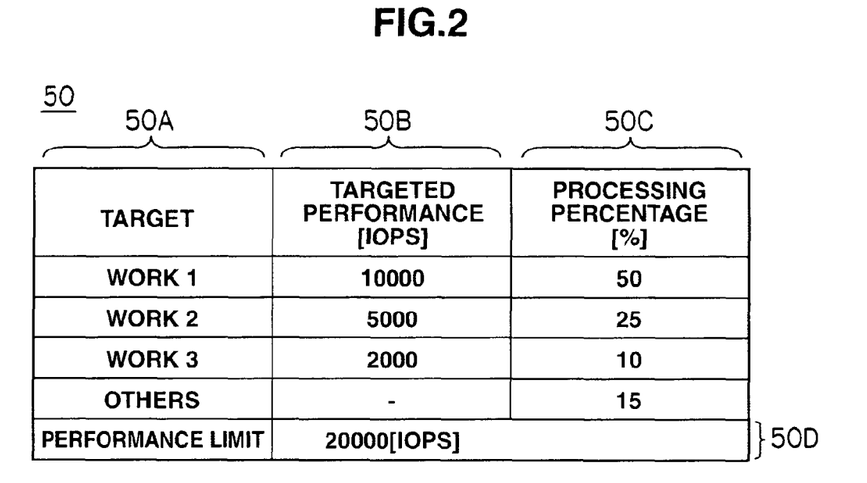
FIG. 2 is a diagram showing the structure of a targeted performance setting table 50 according to the embodiment of the present invention.

Accordingly, the FIG. 2 example shows that "WORK 1" to "WORK 3" are prioritized work, and that for "WORK 1," for example, the targeted performance set by the user is "10000," the processing percentage is "50"%, and the performance limit is "20000."

The processing percentage for each piece of prioritized work will be described later, and is calculated based on the targeted performance for the prioritized work set by the user and the previously-measured performance limit, and the targeted performance and performance percentage for the non-prioritized work group is calculated based on the targeted performances for prioritized work and the performance limit. Thus, no targeted performance is stored in the targeted performance field 50B for the non-priority-designated group in the targeted performance setting table 50 (The "OTHERS" row in the targeted performance field 50B in FIG. 2).

Figure 3:
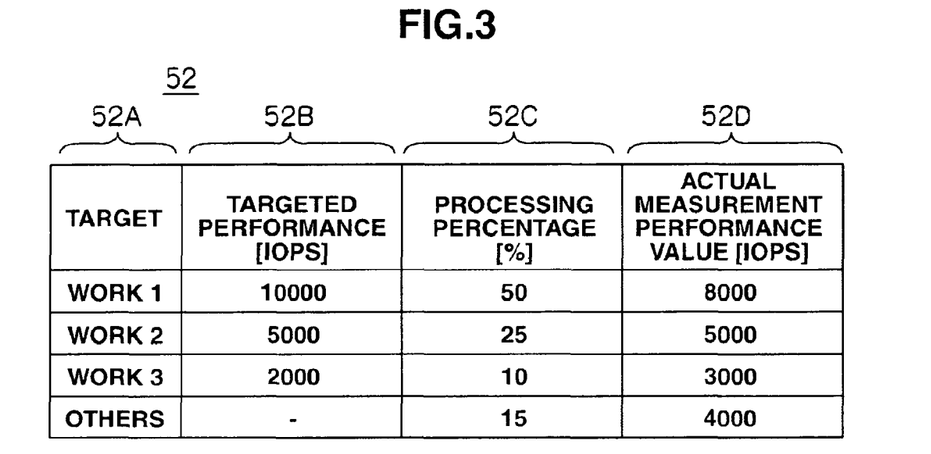
FIG. 3 is a diagram showing the structure of an actual measurement performance value table 52 according to the embodiment of the present invention.

The actual measurement performance value table 52 is a table for managing actual measurement values of the number of data input/output processes per second for each piece of prioritized work and the non-prioritized work group (hereinafter referred to as "actual measurement performance values"), and as shown in FIG. 3, has target fields 52A, targeted performance fields 52B, processing percentage fields 52C, and actual measurement performance value fields 52D.

The target fields 52A, the targeted performance fields 52B, and the processing percentage fields 52C store the same information as stored in the target fields 50A, the targeted performance fields 50B, and the processing percentage fields 50C of the targeted performance setting table 50 described above with reference to FIG. 2. Each actual measurement performance value field 52D stores the aforementioned actual measurement performance values obtained for the corresponding prioritized work or non-prioritized work group.

Accordingly, FIG. 3 shows that the targeted performance of the prioritized work "WORK 1," for example, was "10000," while the actual measurement performance value was "8000."

Figure 4:
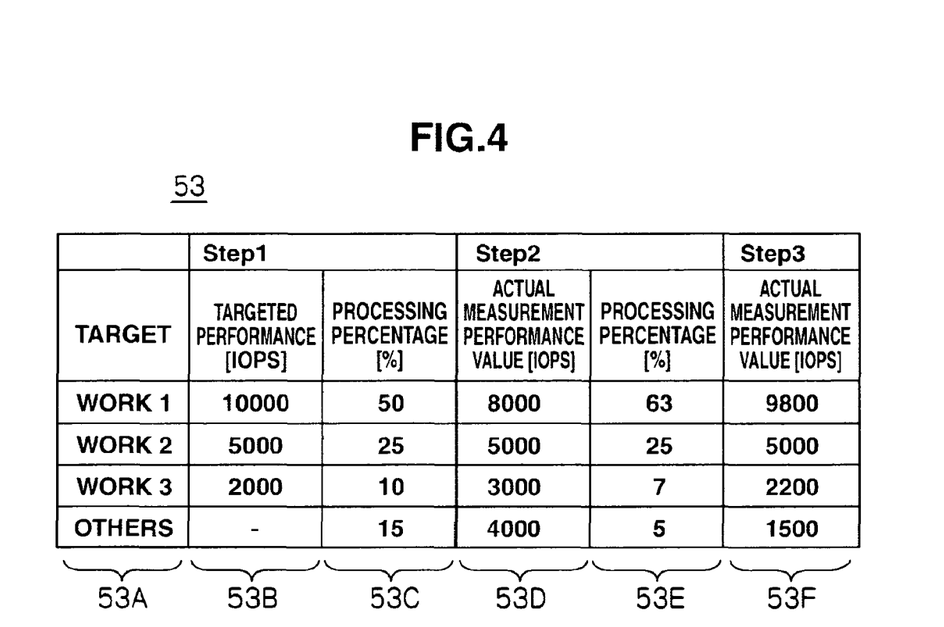
FIG. 4 is a diagram showing the structure of an actual measurement performance value table 53 according to the embodiment of the present invention.

The work-specific actual measurement value table 53 is a table used to manage the actual measurement performance values for multiple measurement times for each piece of prioritized work and the non-prioritized work group, and as shown in FIG. 4, has target fields 53A, targeted performance fields 53B, first and second processing percentage fields 53C and 53E, and first and second actual measurement performance value fields 53D and 53F.

The target fields 53A, the targeted performance fields 53B and the processing percentage fields 53C store the same information as stored in the target fields 50A, the targeted performance fields 50B, and the processing percentage fields 50C of the targeted performance setting table 50 described above with reference to FIG. 2.

Each first actual measurement performance value field 53D stores the actual measurement value for the corresponding prioritized work or non-prioritized work group obtained in the second measurement from the last, and each second processing percentage field 53E stores the processing percentage of the corresponding prioritized work or non-prioritized work group calculated based on the corresponding actual measurement performance value.

Each second actual measurement performance value field 53F stores the aforementioned actual measurement performance value of the corresponding prioritized work or non-prioritized work group obtained when the processing percentage for the corresponding prioritized work or non-prioritized work group is set in the second processing percentage field 53E (i.e., the actual measurement performance value obtained in the last measurement).

Accordingly, FIG. 4 shows that for the prioritized work "WORK 1" with the targeted performance "10000," the actual measurement performance value when the processing percentage was "50"% was "8000," while when the performance percentage changed to "63"%, the actual measurement performance value also changed to "9800."

(2-2) Data Input/Output Prioritizing Processing

Figure 5:
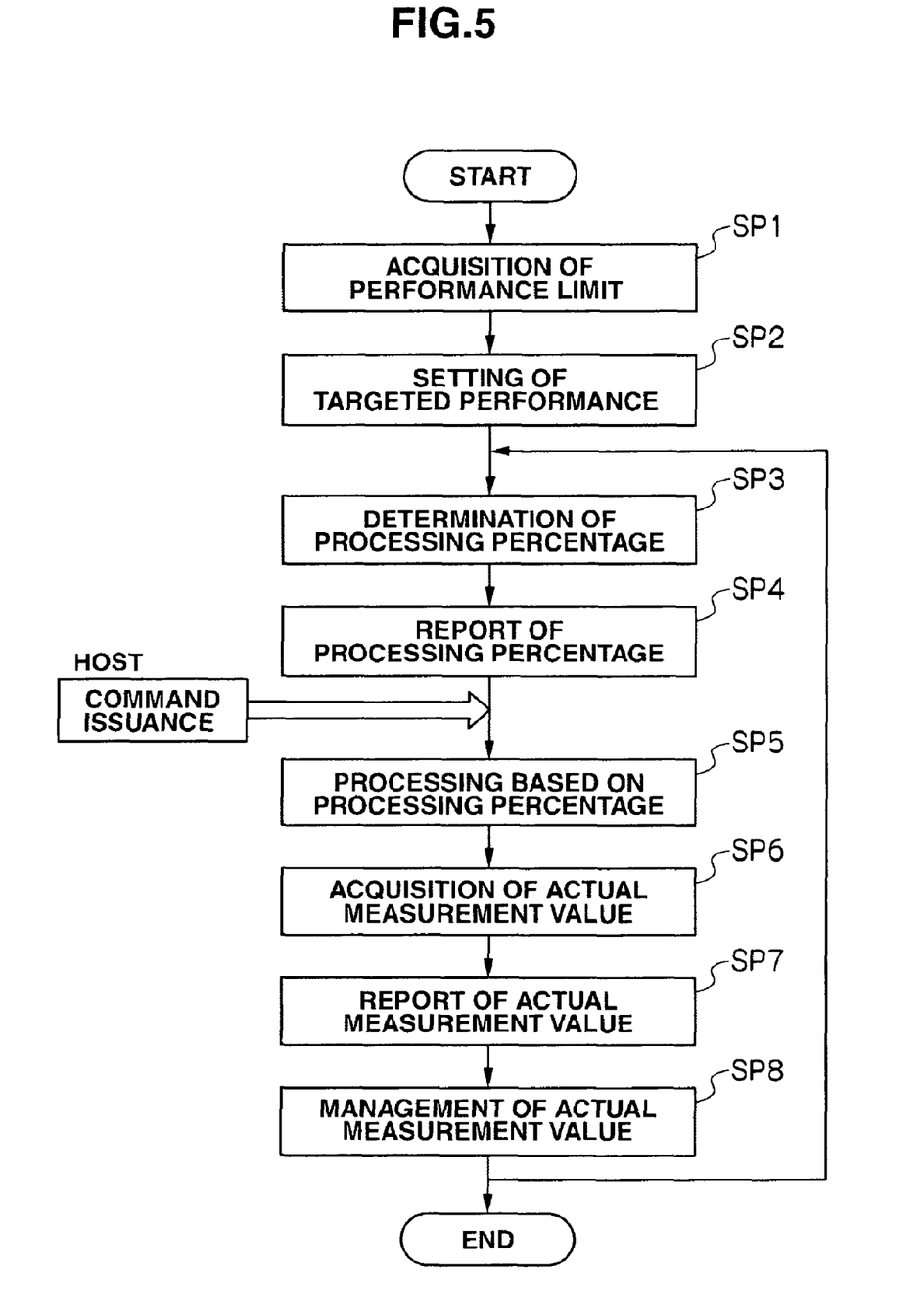
FIG. 5 is a flowchart showing the processing flow according to the embodiment of the present invention.

Next, data input/output prioritizing processing in the storage system 1 according to this embodiment will be described. FIG. 5 is a flowchart showing the flow of processing relating to the data input/output control function in the storage system 1.

In this storage system 1, as part of the data input/output control function, the service processors 24 first obtain the performance limit of the storage apparatus 4 at the system test stage if the storage system 1 is pre-operation, and during operation if it is in operation (SP1). The performance limit thus obtained is stored in the lowermost row in the aforementioned targeted performance setting table 50 (FIG. 2) held in the memory 25 in the service processors 24.

Subsequently, the user designates a desired one or more pieces of prioritized work via the service processors 24, and sets the targeted performances for the prioritized work with reference to the performance limit obtained at step SP1 (SP2).

The CPUs 26 in the service processors 24 provide a unique ID to each of the pieces of designated prioritized work, and stores these IDs and targeted performances set for the prioritized work corresponding to these IDs in the corresponding target fields 50A and the corresponding targeted performance fields 50B of their respective targeted performance setting tables 50, respectively. The CPUs 26 send the IDs for the prioritized work, the targeted performances set for the prioritized work corresponding to the IDs, and the performance limit of the storage apparatus 4 obtained at step SP1 to the operation information monitoring unit 7 and the load control unit 8.

The CPU 40 in the operation information monitoring unit 7 stores the IDs for the prioritized work, and the targeted performances of the prioritized work in the corresponding target fields 52A and the corresponding targeted performance value fields 52B of the actual measurement performance value table 52, and also in the corresponding target fields 53A and the corresponding targeted performance fields 53B of the work-specific actual measurement performance value table 53.

The CPU 42 in the load control unit 8 creates a targeted performance setting table 50 with the same content as that of the targeted performance setting table 50 held in the memory 25 in the service processors 24, based on that information sent from the service processors 24, and stores it in the memory 43.

The CPU 42 in the load control unit 8 then calculates and determines the processing percentage for each of the prioritized work and the non-prioritized work group based on the targeted performance of each prioritized work and the performance limit of the storage apparatus 4, which are registered in the targeted performance setting table 50 stored in the memory 43 as described above (SP3).

More specifically, the CPU 42, as shown in FIG. 4, when the prioritized work is "WORK 1," "WORK 2," and "WORK 3," their targeted performances are "10000," "5000", and "2000," respectively, and the performance limit of the storage apparatus 4 is "20000" I/Os per second calculates and determines the processing percentage for "WORK 1" as indicated in the following calculation:
(Calculation/Formula 1)

$$10000/20000.\text{times}.100=50[\%] \quad (1); \text{ and}$$

also calculates the processing percentage for "WORK 2" as indicated in the following calculation:
(Calculation/Formula 2)

$$5000/20000.\text{times}.100=25[\%] \quad (2).$$

The CPU 42 calculates and determines the processing percentage for "WORK 3" as indicated in the following calculation:
(Calculation/Formula 3)

$$2000/20000.\text{times}.100=10[\%] \quad (3); \text{ and}$$

also calculates and determines the processing percentage for the non-prioritized work group ("OTHERS" in FIG. 4) as indicated in the following calculation, using the processing percentages calculated for "WORK 1" to "WORK 3":
(Calculation 4)

$$100-(50+25+10)=15[\%] \quad (4)$$

The CPU 42, upon determining the processing percentages for the prioritized work and the non-prioritized work group as described above, stores the processing percentages in the processing percentage fields 50C of the targeted performance setting table 50, and also reports them to the operation information monitoring unit 7 (SP4).

The CPU 40 in the operation information monitoring unit 7, upon receipt of that report, stores the processing percentages for the prioritized work and non-prioritized work group in the processing percentage fields 52C of the actual measurement performance value table 52, and also in the first processing percentage fields 53C of the work-specific actual measurement performance value table 53, and also reports the processing percentages to the service processors 24 (SP4).

Each service processor 24, upon receipt of that report, stores the processing percentages for the prioritized work and the non-prioritized work group in the targeted performance fields 50B of its targeted performance setting table 50, and reports the processing percentages to the channel processors 21 under its control (SP4).

Each channel processor 21, upon receipt of that report, internally sets the processing percentages for the prioritized work and the non-prioritized work group as the designated processing percentages. Each channel processor 24 then executes, in response to data input/output request commands sent from the path control unit 13 in the host apparatus 2, data input/output processing for the prioritized work and the non-prioritized work group in a particular order, for example, the order shown in the "I/O PROCESSING ORDER" field 51C in FIG. 6 so that the internally-set processing percentages are met (SP5).

In that case, each channel processor 21 measures the total number of data input/output processes for the prioritized work and the non-prioritized work group for which the channel processor 21 has processed data input/output request commands, and the number of data input/output processes for each of the prioritized work and the non-prioritized work group by individually counting the number using counters (not shown).

Figure 6:
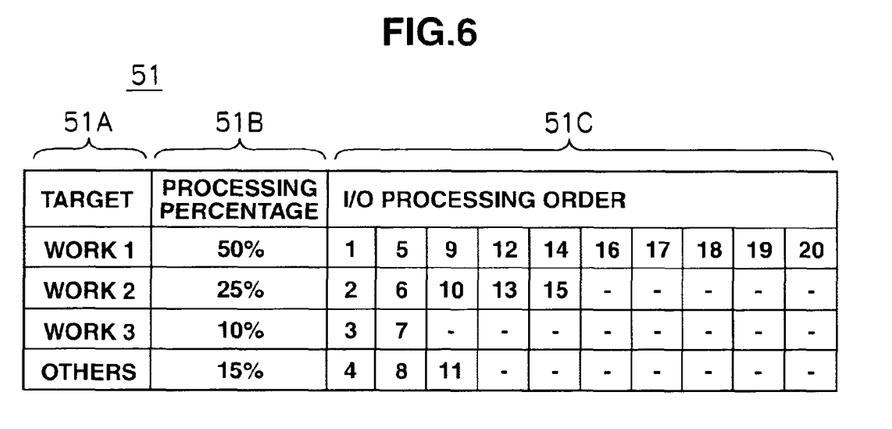
FIG. 6 is a diagram showing the structure of an actual measurement performance value table according to the embodiment of the present invention.

The channel processors 21 halt data input/output processing for the prioritized work and the non-prioritized work group when they have performed data input/output processing the number of times previously set for each of the prioritized work and the non-prioritized work group based on their processing percentages; i.e., in the FIG. 6 example, 50 I/Os for "WORK 1" is 25 I/Os for "WORK 2," 10 I/Os for "WORK 3," and 15 I/Os for "OTHERS." The channel processors 21 then clear the count value for each counter (i.e., change them back to "0") when the total number of data input/output processes for the prioritized work and the non-prioritized work group reaches the total value of the number of processes set for each of the prioritized work and the non-prioritized work group (e.g., "100 I/Os"). As described above, the channel processors 21 execute data input/output processing for each of the prioritized work and the non-prioritized work group at the frequencies corresponding to the internally-set processing percentages.

At that time, the channel processors 21, if they have received no data input/output request commands for any prioritized work or the non-prioritized work group, allocate the data input/output processing capacity for that prioritized work or non-prioritized work group to other prioritized work or non-prioritized work group. However, there is a problem in that if it continues to receive no data input/output request commands for that prioritized work or non-prioritized work group at all, subsequent data input/output processing will not be performed when the number of data input/output processes for the other prioritized work and the non-prioritized work reaches the previously-set numbers. Therefore, in this embodiment, the channel processors 21 clear each counter's count value based on the performance limit. More specifically, when the performance limit is "20000," the time required for performing the data input/output processing 100 times is 5[ms], as indicated in the following calculation:
(Calculation 5)

$$100/20000 \times 100 = 0.005[s] = 5[ms] \quad (5), \text{ and}$$

therefore, the channel processors 21 clear the count value of each counter every period of 5 [ms].

For enabling the channel processors 21 to perform the above processing, the path control unit 13 in the host apparatus 2 issues data input/output request commands with IDs, which differ depending on the work, added so that the channel processors 21 can recognize which piece of work each data input/output command is directed to.

On the other hand, the channel processors 21, during the execution of the above data input/output processes, obtain the actual measurement performance values for the prioritized work and the non-prioritized work group using an existing technique every predetermined period of time (e.g., every period of one second) (SP6). Then the channel processors 21 report the obtained actual measurement performance values for the prioritized work and the non-prioritized work group to the operation information control unit 7 via the service processors 24 (SP7).

The CPU 40 in the operation information control unit 7, upon receipt of this report, stores and manages the actual measurement performance values for the prioritized work and the non-prioritized work group in the corresponding actual measurement performance value fields 52D of the actual measurement performance value table 52, and the corresponding first or second actual measurement performance value fields 53D or 53F of the work-specific actual measurement performance value table 53 (SP8).

After that, in the storage system 1, the processing after the determination of the processing percentages (SP3) will be repeated every certain period of time (hereinafter referred to as the "processing percentage determination period" (SP3 to SP8).

Considering that processing percentage determination period as being a fixed period of time, the processing percentage for the prioritized work and the non-prioritized work group in the next processing percentage determination period is determined based on average actual measurement performance values for that fixed period of time. However, if there is no need to frequently change the processing percentages for the prioritized work and the non-prioritized work group, like when the performances are steady, the processing percentage determination period may be changed, using a predetermined period of time (e.g., on a 10-minute basis) via the service processors 24.

As described above, data input/output processes in the channel processors 21 are performed based on the performance percentages determined at step SP3. However, in reality, components other than the channel processors 21 also affect the determination of the data input/output processing percentages for the prioritized work and the non-prioritized work group. Thus, even when the above data input/output processes are performed based on those processing percentages, some actual measurement performance value may not reach or may exceed the targeted value. An example of a case where the channel processor 21 performance is equal to or less than the targeted performance is when a lot of time is consumed for data input/output processing and the next processing percentage determination period has come before the number of data input/output processes in the entire storage system 1 reaches the predetermined number of times (e.g., 100 times). An example of a case where the channel processor 21 performance is equal to or greater than the targeted performance is when the total number of data input/output processes in the entire storage system 1 has reached the predetermined number of processes before the next processing percentage determination period.

Therefore, in this embodiment, the load control unit 8 determines the processing percentage for the prioritized work and the non-prioritized work group for the next processing percentage determination period so that the relationship indicated by the following formula is met, based on the processing percentages for the prioritized work and the non-prioritized work group determined in the immediately previous processing percentage determination period, the then-obtained actual measurement value for each piece of prioritized work and the non-prioritized work group, and the targeted performances set for the prioritized work and the non-prioritized work group:
(Calculation/Formula 6)

$$\text{target performance: next processing percentage} = \text{actual measurement performance value: previous processing percentage} \quad (6)$$

Taking the actual measurement performance table 52 in FIG. 3 as an example, where for "WORK 1," the targeted performance is "10000" and the processing percentage is "50"%, the then-obtained actual measurement performance value was "8000" and accordingly, the processing percentage a of "WORK 1" in the next processing percentage determination period can be obtained by the following calculation:
(Calculation 7)

$$a = 10000 \times 50/8000 = 63[\%] \quad (7)$$

In the same way, the processing percentage for the next processing percentage determination period can be calculated as "25"% for "WORK 2," "7"% for "WORK 3," and "5"% for the non-prioritized work group.

The processing percentage of the non-prioritized work group is what remains after the processing percentages for the prioritized work have been determined. Accordingly, if the total processing percentage for the prioritized work reaches "100," the processing percentage for the non-prioritized work group will be "0" or a negative figure value, and data input/output processing will not be performed for the non-prioritized work group. Also, if the processing percentage of any one piece of prioritized work is determined as "100", data input/output processing will not be performed for the non-prioritized work group.

Figure 8:
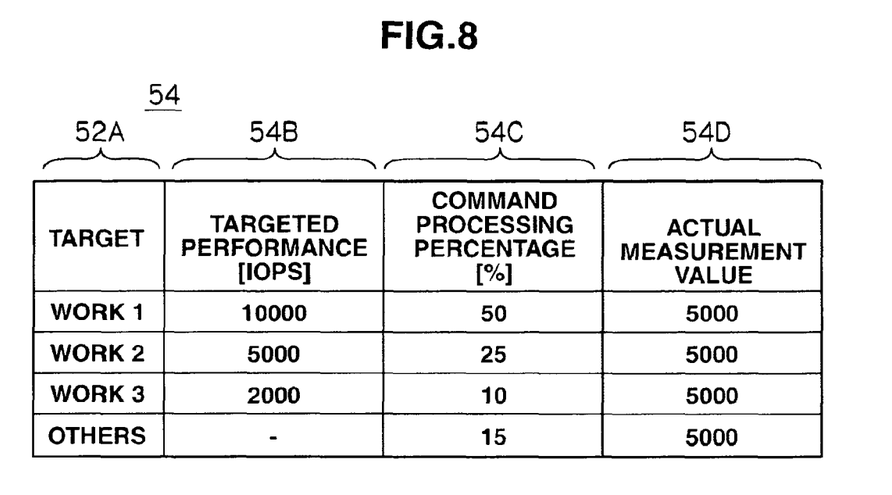
FIG. 8 is a diagram showing the structure of an actual measurement performance value table according to the embodiment of the present invention.

Taking the FIG. 8 example where for "WORK 1," the targeted performance is "10000," the processing percentage is "50"%, and the actual measurement performance value is "5000," the processing percentage in the next processing performance determination period can be calculated in the following calculation:
(Calculation 8)

$$10000 \times 50/5000 = 100[\%] \quad (8)$$

In the same way, the processing percentage for "WORK 2" for the next processing performance determination period can be calculated in the following calculation:
(Calculation 9)

$$5000 \times 25/5000 = 25[\%] \quad (9);$$

the processing percentage for "WORK 3" for the next processing performance determination period can be calculated in the following calculation:
(Calculation 10)

$$2000 \times 10/5000 = 4[\%] \quad (10); \text{ and}$$

the processing percentage for the non-prioritized work group for the next processing performance determination period can be calculated in the following calculation:
(Calculation)

$$100-(100+25+4)=-29[\%] \quad (11).$$

When the processing percentage for the non-prioritized work group is a negative value as above, a failure occurs, in which the processing for the non-prioritized work group will not be executed. Therefore, in this embodiment, the lower limit value for each piece of prioritized work and the non-prioritized work group is set to "1" and a processing capacity of "1" percent can be reserved for each piece of prioritized work and the non-prioritized work group. The load control unit 8, when the processing percentage of any prioritized work or the non-prioritized work group is "0" or a negative value, determines the processing percentages from the ratio of the processing percentages of the prioritized work and the non-prioritized work group.

In the FIG. 8 example, the processing percentage for "WORK 1" will be calculated and determined in the following calculation:
(Calculation 12)

$$100/(100+25+4+1).\text{times}.100=77[\%] \quad (12)$$

The processing percentage for "WORK 2" will be calculated and determined in the following calculation:
(Calculation 13)

$$25/(100+25+4+1).\text{times}.100=19[\%] \quad (13)$$

The processing percentage for "WORK 3" will be calculated and determined in the following calculation:
(Calculation 14)

$$4/(100+25+4+1).\text{times}.100=3[\%] \quad (14)$$

The processing percentage for the non-prioritized work group will be calculated and determined in the following calculation:
(Calculation 15)

$$100-(77+19+3)=1[\%] \quad (15)$$

Consequently, the sum of the processing percentages for the prioritized work and the non-prioritized work group will be "100," and none of the processing percentages will be "0" or a negative value.

Figure 7:
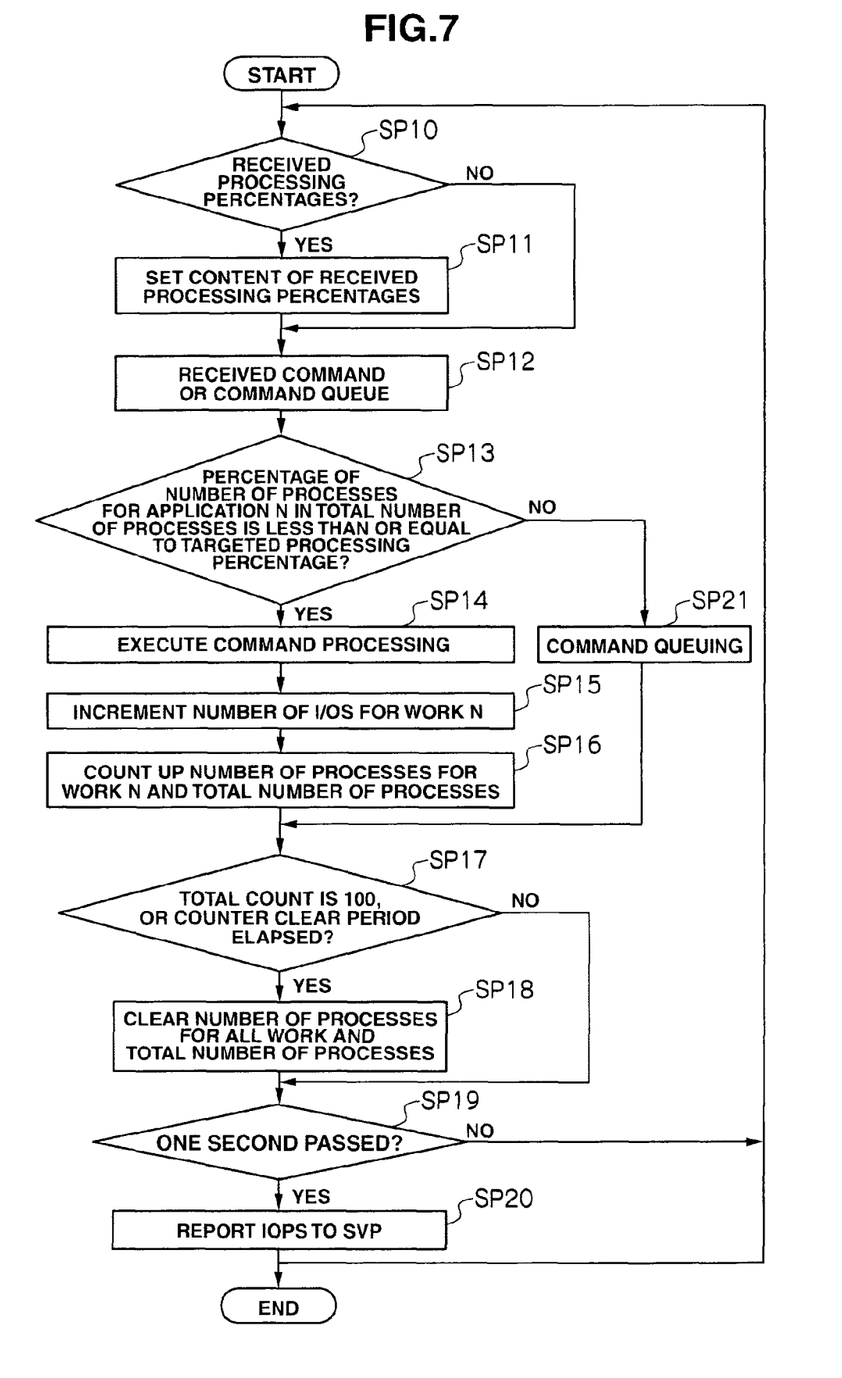
FIG. 7 is a flowchart showing the flow of processing performed by a channel processor 21.

Next, the processing performed by the channel processors 21, which has been described in relation to step SP 5 in FIG. 5 will be explained with reference to FIG. 7. FIG. 7 is a flowchart showing a series of steps of the processing performed by a channel processor 21 that has received a data input/output request command from the host apparatus 2.

The channel processor 21, starting the above-described processing percentage-based data input/output processing, first confirms whether or not it has received a report of the processing percentages for the prioritized work and the non-prioritized work group calculated by the load control unit 8 (SP10).

If it has received the processing percentage report (SP10: YES), the channel processor 21 makes the settings according to the content of the received report (SP11). Meanwhile, if the channel processor 21 has not received the processing percentage report (SP10: NO), or if the processing percentages have been set, it proceeds to step SP12, and waits for an instruction command from the host apparatus 2.

Then, upon receipt of a command or command queue from the host apparatus 2 (SP12), the channel processor 2, if the commands are provided with respective IDs, judges which work the command is directed to based on the ID. The channel processor 21 also confirms whether the percentage of the number of processes for that work is equal to or less than the targeted processing percentage of the entire storage system 1 (SP13).

If the processing of the command does not exceed the targeted processing percentage (SP13: YES), the channel processor 21 executes the command processing (SP14). Meanwhile, if the processing of the command exceeds the targeted processing percentage (SP13: NO), the channel processor 21 performs command queuing, which queues commands, without processing the commands (SP21).

The channel processor 21, after the execution of the command processing, increments the number of I/Os for that work (SP15), and confirms the number of processes for that work, and the number of processes for the entire storage system 1 (SP16). The channel processor 21, upon confirmation of the number of processes (SP16), or upon termination of the command queuing (SP21), confirms whether the processing percentage of the entire storage system 1 is 100 or whether the counter clearing period elapsed (SP17).

If the processing percentage of the entire storage system 1 is 100, or the counter clearing period has elapsed (SP17: YES), the channel adapter 21 resets the number of processes for the entire storage system 1 or the counter clearing period (SP18), waits for one second to pass (SP19: YES), reports the total number of I/Os in the storage system 1 to the service processors 24 (SP20), and terminates the processing. If the channel adapter 21 continues to process commands, it returns to step SP10, and repeats the similar steps, sequentially switching the steps to those for the relevant processing (steps SP10 to SP20). If the channel adapter does not wait for one second to pass (SP19: NO), returns to step SP10 without reporting the total number of I/Os to the service processors 24 and repeats the similar steps, sequentially switching the steps to those for the relevant processing (steps SP10 to SP20).

Next, the method for determining the processing percentage for the scenario in which the CPU 42 returns to step SP3 after the termination of step SP8 in the flowchart shown in FIG. 5 will be explained.

Figure 9:
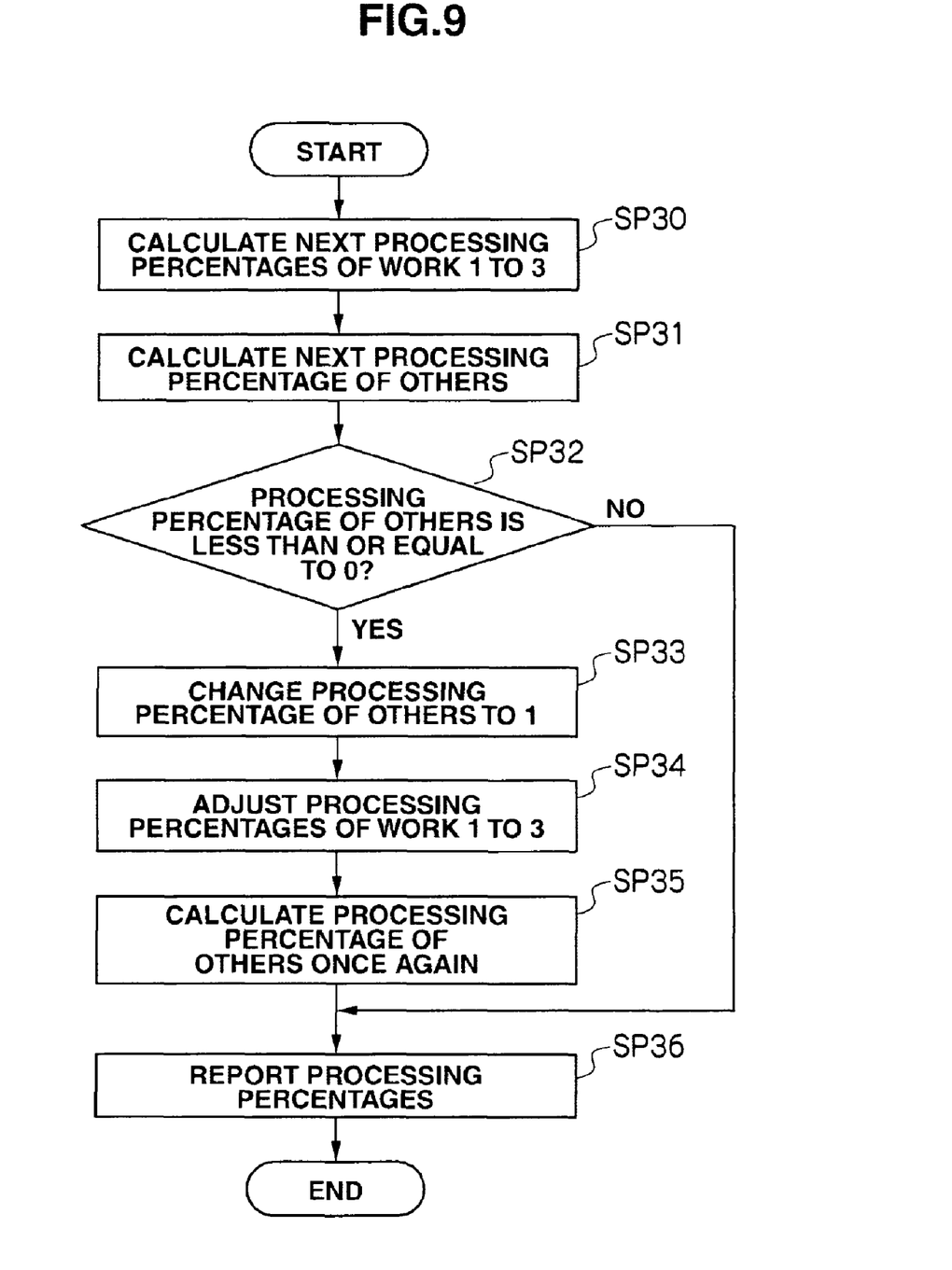
FIG. 9 is a flowchart showing the flow of the processing for re-setting a processing percentage.

FIG. 9 is a flowchart showing a series of steps for determining the second processing percentage after termination of the first processing. The CPU 42 in the load control unit 8 calculates the second processing percentages for the prioritized work (SP30). The CPU 42 also calculates the second processing percentage for the non-prioritized work group (SP31). The CPU 42 confirms whether or not the processing percentage of the non-prioritized work group is equal to or less than "0" (SP32). If it is equal to or less than "0" (SP32: YES), the CPU 42 changes the processing percentage to "1" (SP33), and adjusts the processing percentages of the prioritized work (SP34). Then the CPU 42 calculates the processing percentage of the non-priority-designated group once again (SP35). The CPU 42, upon the determination of the processing percentages for all the work, reports those processing percentages to the channel processors 21A, 21B, 21C, and 21D, and other relevant components (SP36), and terminates the processing.

(2-3) Effect of the Embodiment

This embodiment makes it possible to perform data input/output processing for each piece of prioritized work at a frequency corresponding to a targeted performance desired by the user. Also, it makes it possible to control the data input/output processing frequencies for the prioritized work more accurately to bring them close to the targeted performances, by changing the processing percentages based on the actual measurement performance values of the prioritized work and the non-prioritized work group obtained in the previous processing percentage determining period.

(3) Other Embodiments

Figure 11:
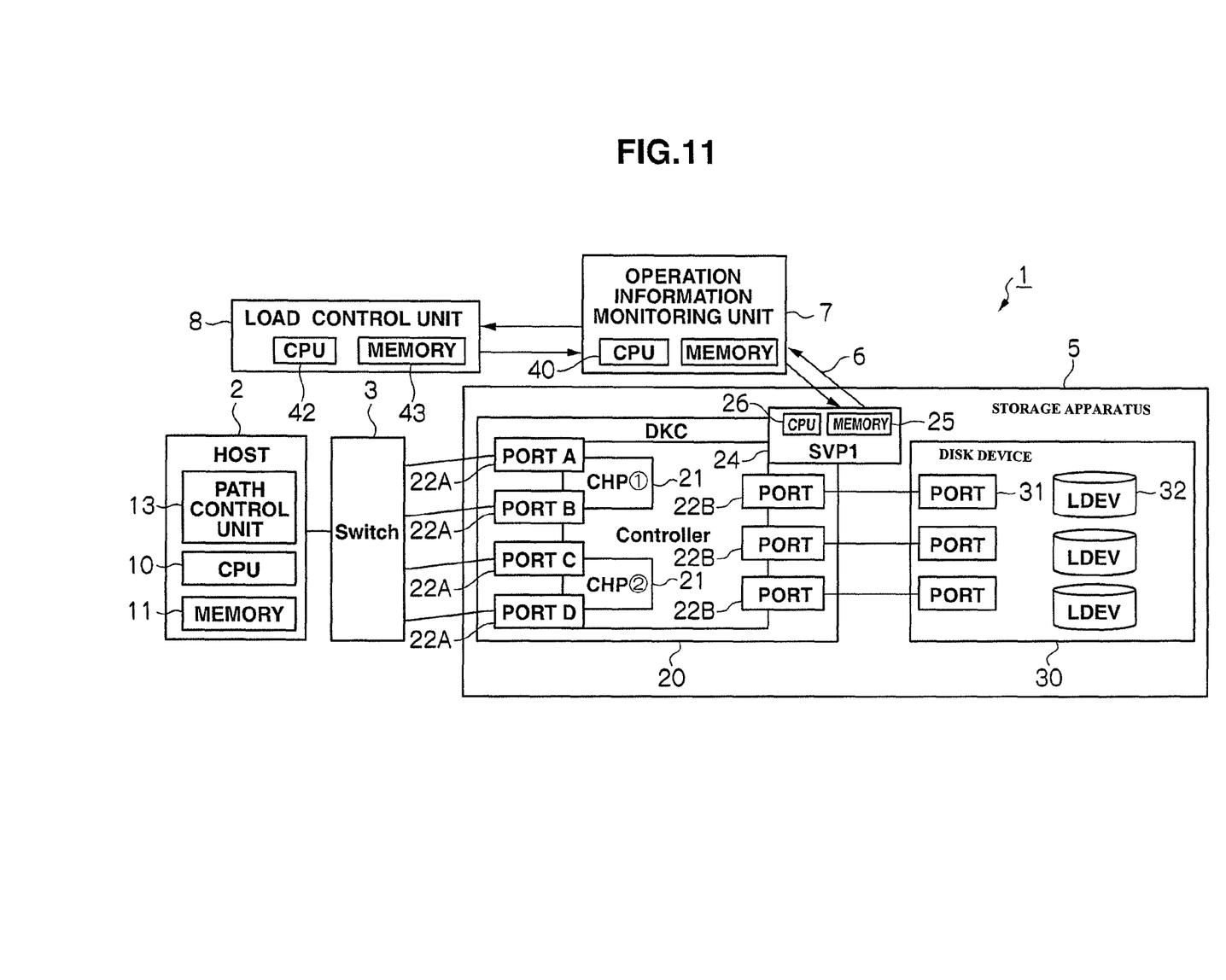
FIG. 11 is a block diagram showing a storage system 1 including a single control unit 20.

The above-described embodiment relates to the case where the storage apparatus 4 has a plurality of control units 20. However, the present invention is not limited to that case, and as shown in FIG. 11, it may have a single control unit 20.

Figure 12:
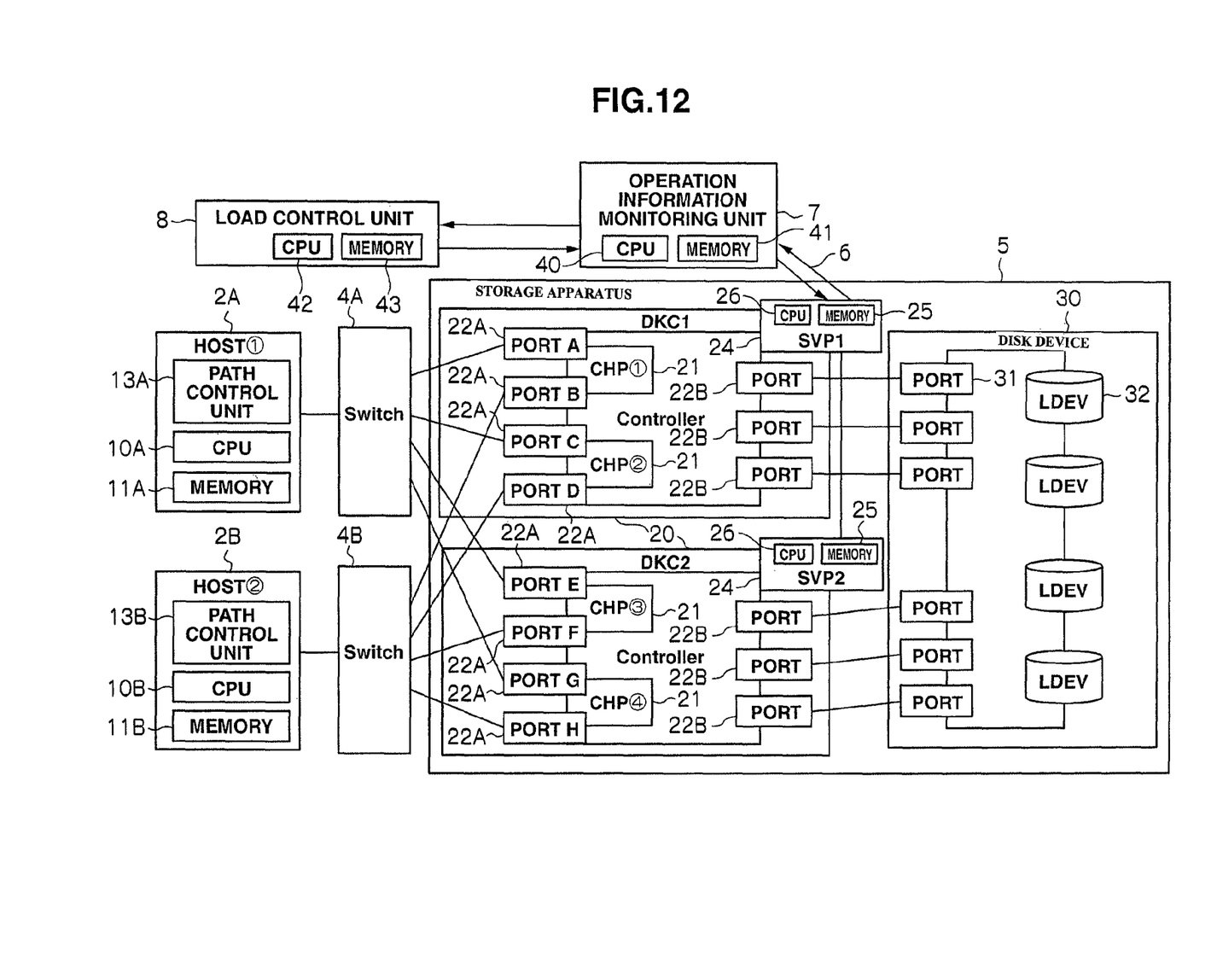
FIG. 12 is a block diagram showing a storage system 1 including a plurality of host apparatuses 2.

The above-described embodiment relates to the case where the storage apparatus is connected to one host apparatus 2. However, the present invention is not limited to that case, and as shown in FIG. 12, it may be connected to a plurality of host apparatuses 2.

Figure 10:
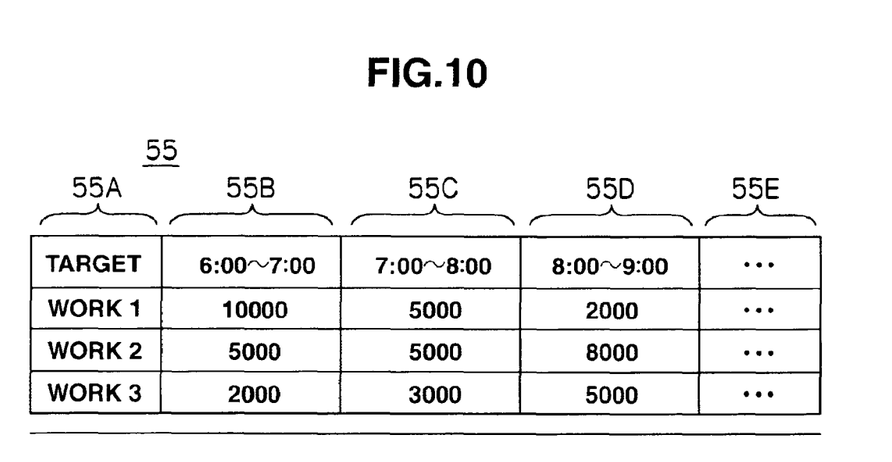
FIG. 10 is a diagram showing the structure of a table for the scenario where the processing percentages for work change every period of time.

The above-described embodiment includes no specific descriptions, but if the use frequency for work changes depending on the period of time, and the user wishes to change the processing percentage for the work depending on the period of time, the targeted performance for each period of time may be set in advance and the CPU 42 in the load control unit 8 may re-set the targeted performance according to the set targeted performance every period of time, making continuous operation possible only with a series of settings being made at the start of operation of the storage system 1. Like the FIG. 10 example where the targeted performance value from 6:00 to 7:00 is "10000," that from 7:00 to 8:00 is "5000," that from 8:00 to 9:00 is "2000" for prioritized work with the ID "WORK 1," the targeted performance value may be changed depending on the period of time.

Figure 13:
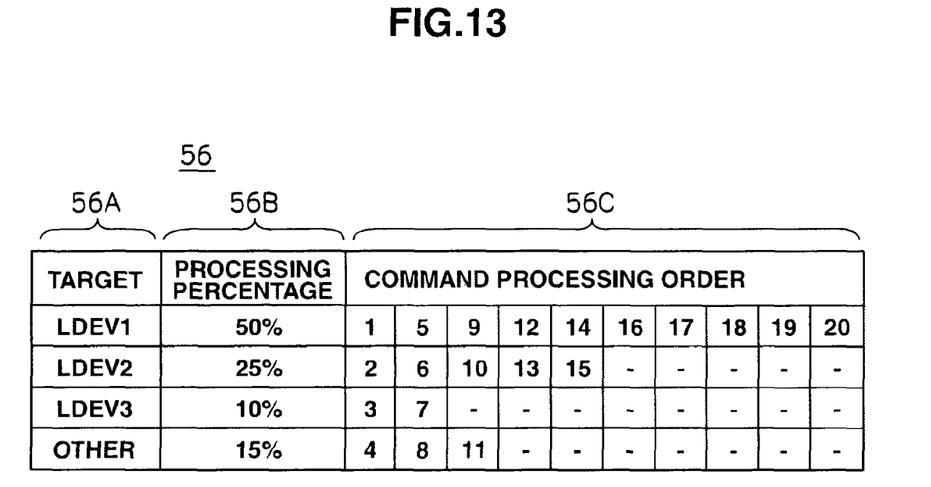
FIG. 13 is a diagram showing a data input/output processing order table according to the embodiment of the present invention.

The above-described embodiment relates to the case where the targets, which correspond to data input/output processing request types that are subject to the data input/output prioritizing processing control, are classified according to the individual work (applications) that issued the data input/output requests. However, the present invention is not limited to that case, and as shown in FIG. 13, the targets may be classified according to devices (LDEVs) in which data is written/read to/from. Also, the targets may be classified according to the units of data processing, the programs that process data, the areas that store data, or others.

The present invention can be applied to a broad range of storage systems with various kinds of configurations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system comprising:
a storage apparatus having a disk device unit that provides a logical volume to a host apparatus, and a control unit that has a plurality of processors executing data I/O processes to the disk device unit, the data I/O processes being for a plurality of jobs including a first prioritized job, a second prioritized job, and plurality of non-prioritized jobs; and
a management server operatively connected to the storage apparatus and configured to hold first targeted performance information indicating the number of data I/O processes per unit of time for the first prioritized job set by a user, second targeted performance information indicating the number of data I/O processes per unit of time for the second prioritized job set by the user and limit performance information indicating the number of data I/O processes per unit of time in the storage apparatus, wherein the management server is configured to:
calculate a first data I/O processing ratio based on the first targeted performance information and the limit performance information so that the number of data I/O processes per unit of time for the first prioritized job set by user can be achieved if the plurality of processors executes the data I/O processes for the first prioritized job based on the first data I/O processing ratio,
calculate a second data I/O processing ratio based on the second targeted performance information and the limit performance information so that the number of data I/O processes per unit of time for the second prioritized job set by the user can be achieved if the plurality of processors executes the data I/O processes for the second prioritized job based on the second data I/O processing ratio,
calculate a third data I/O processing ratio for the plurality of non-prioritized jobs in accordance with the rest of the calculated first data I/O processing ratio and the calculated second data I/O processing ratio,
send, if the calculated third data I/O processing ratio is above a predetermined value, the calculated first data I/O processing ratio, the calculated second data I/O processing ratio, and the calculated third data I/O processing ratio to the control unit, and
change, if the calculated third data I/O processing ratio is below the predetermined value, the calculated first data I/O processing ratio and, the calculated second data I/O processing ratio so that the third data I/O processing ratio will be above the predetermined value, and send the changed first data I/O processing ratio, the changed second data I/O processing ratio, and the changed third data I/O processing ratio to the control unit;
wherein, upon receipt of the first data I/O processing ratio, the second data I/O processing ratio and the third data I/O processing ratio, the control unit controls the plurality of processors to execute:
the data I/O processes for the first prioritized job based on the received first data I/O processing ratio,
the data I/O processes for the second prioritized job based on the received second data I/O processing ratio, and
the data I/O processes for the plurality of non-prioritized jobs based on the received third data I/O processing ratio;
wherein the control unit measures actual performance information indicating the number of actual data I/O processes per unit of time for each of the first prioritized job and the second prioritized job, and sends the actual performance information to the management server; and
wherein, upon receipt of the actual performance information, the management server compares the actual performance information with the first targeted performance information and the second targeted performance information, updates the first data I/O processing ratio, the second data I/O processing ratio and the third data I/O processing ratio if the actual performance information falls short of first targeted performance information and the second targeted performance information, and sends the updated the first data I/O processing ratio, the second data I/O processing ratio and the third data I/O processing ratio to the control unit.

2. The storage system according to claim 1, wherein the control unit counts up the number of the data I/O processes for the respective jobs, and if the total number of the data I/O processes has reached a predetermined value in a predetermined period of time for any of the respective jobs, the control unit performs limit control of the data I/O processes for that job.

3. The storage system according to claim 2, the control unit resets the counted-up number of the data I/O processes in every predetermined period of time.

4. The storage system according to claim 1, wherein the respective jobs are categorized into one or more priority jobs for which data I/O processes are prioritized and a group of one or more non-priority jobs.

5. The storage system according to claim 4, wherein the management server determines the data I/O processing ratio between each of the one or more priority jobs and the group of the one or more non-priority jobs.

6. The storage system according to claim 5, wherein the data I/O processing ratio of the group of the one or more non-priority jobs is assigned what remains after the data I/O processing ratio of each of the one or more priority jobs is determined.

7. The storage system according to claim 6, wherein the data I/O processing ratio of the group of the one or more non-priority jobs is guaranteed a minimum ratio.

8. A method performed in a storage system having a storage apparatus having a disk device unit that provides a logical volume to a host apparatus, and a control unit that has a plurality of processors executing data I/O processes to the disk device unit, the data I/O processes being for a plurality of jobs including a first prioritized job, a second prioritized job, and plurality of non-prioritized jobs, a management server being operatively connected to the storage apparatus and configured to hold first targeted performance information indicating the number of data I/O processes per unit of time for the first prioritized job set by a user, second targeted performance information indicating the number of data I/O processes per unit of time for the second prioritized job set by the and limit performance information indicating the number of data I/O processes per unit of time in the storage apparatus, the method comprising the steps of:

calculating, by the management server, a first data I/O processing ratio based on the first targeted performance information the limit performance information so that the number of data I/O processes per unit of time for the first prioritized job set by a user can be achieved if the plurality of processors executes the data I/O processes for the first prioritized job based on the first data I/O processing ratio;

calculating a second data I/O processing ratio based on the second targeted performance information and the limit performance information so that the number of data I/O processes per unit of time for the second prioritized job set by the user can be achieved if the plurality of processors executes the data I/O processes for the second prioritized job based on the second data I/O processing ratio;

calculating a third data I/O processing ratio for the plurality of non-prioritized jobs in accordance with the rest of the calculated first data I/O processing ratio and the calculated second data I/O processing ratio;

sending, if the calculated third data I/O processing ratio is above a predetermined value, the calculated first data I/O processing ratio, the calculated second data I/O processing ratio, and the calculated third data I/O processing ratio to the control unit;

changing, if the calculated third data I/O processing ratio is below the predetermined value, the calculated first data I/O processing ratio and, the calculated second data I/O processing ratio so that the third data I/O processing ratio will be above the predetermined value, and send the changed first data I/O processing ratio, the changed second data I/O processing ratio, and the changed third data I/O processing ratio to the control unit, wherein upon receipt of the first I/O processing ratio, the second data I/O processing ratio and the third data I/O processing ratio, performing, by the control unit controls the plurality of processors to execute:

the data I/O processes for the first prioritized job based on the received first data I/O processing ratio, the data I/O processes for the second prioritized job based on the received second data I/O processing ratio, and the data I/O processes for the plurality of non-prioritized jobs based on the received third data I/O processing ratio;

measuring, by the control unit, actual performance information indicating the number of actual data I/O processes per unit of time for each of the first prioritized job and the second prioritized job, and sending the actual performance information to the management server; and upon receipt of the actual performance information, comparing, by the management server, the actual performance information with the first targeted performance information and the second targeted performance information, updating the first data I/O processing ratio, the second data I/O processing ratio and the third data I/O processing ratio if the actual performance information falls short of first targeted performance information and the second targeted performance information and sending the updated first data I/O processing ratio, the second data I/O processing ratio and the third data I/O processing ratio to the control unit.

9. The method according to claim 8, wherein the control unit counts up the number of the data I/O processes for the respective jobs, and if the total number of the data I/O processes has reached a predetermined value in a predetermined period of time for any of the respective jobs, the control unit performs limit control of the data I/O processes for that job.

10. The method according to claim 9, the control unit resets the counted-up number of the data I/O processes in every predetermined period of time.

11. The method according to claim 8, wherein the respective jobs are categorized into one or more priority jobs for which data I/O processes are prioritized and a group of one or more non-priority jobs.

12. The method according to claim 11, wherein the management server determines the data I/O processing ratio between each of the one or more priority jobs and the group of the one or more non-priority jobs.

13. The method according to claim 12, wherein the data I/O processing ratio of the group of the one or more non-priority jobs is assigned what remains after the data I/O processing ratio of each of the one or more priority jobs is determined.

14. The method according to claim 13, wherein the data I/O processing ratio of the group of the one or more non-priority jobs is guaranteed a minimum ratio.

* * * * *